United States Patent
Kellner et al.

(10) Patent No.: US 12,341,214 B2
(45) Date of Patent: Jun. 24, 2025

(54) BATTERY MODULE

(71) Applicant: Dr. Ing. h.c. F. Porsche Aktiengesellschaft, Stuttgart (DE)

(72) Inventors: Philipp Kellner, Renningen (DE); Dieter Schiebel, Korntal-Münchingen (DE); Adrian Starczewski, Korntal-Münchingen (DE); Immanuel Vogel, Kornwestheim (DE); Sascha Mostofi, Zeltingen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 606 days.

(21) Appl. No.: 17/673,997

(22) Filed: Feb. 17, 2022

(65) Prior Publication Data

US 2022/0263184 A1   Aug. 18, 2022

(30) Foreign Application Priority Data

Feb. 18, 2021   (DE) ...................... 10 2021 103 866.9

(51) Int. Cl.
  *H01M 50/273* (2021.01)
  *H01M 50/209* (2021.01)

(52) U.S. Cl.
  CPC ....... *H01M 50/273* (2021.01); *H01M 50/209* (2021.01); *H01M 2220/20* (2013.01)

(58) Field of Classification Search
  CPC ............ H01M 50/273; H01M 50/209; H01M 2220/20

(Continued)

(56) References Cited

U.S. PATENT DOCUMENTS 6,235,418 B1 * 5/2001 Pedicni ............... H01M 50/227
                                                     429/407
2012/0114986 A1   5/2012 Kim et al.
(Continued)

FOREIGN PATENT DOCUMENTS

CN   109841773 A   6/2019
CN   111916875 A   11/2020
(Continued)

OTHER PUBLICATIONS

Great Britain Combined Search and Examination Report for Application No. GB2201751.1, dated Aug. 4, 2022, 3 pages.
(Continued)

*Primary Examiner* — Nicholas A Smith
*Assistant Examiner* — Kevin Nguyen
(74) *Attorney, Agent, or Firm* — Buchanan Ingersoll & Rooney PC

(57) ABSTRACT

A battery module for a partially or fully electrically operated vehicle, having a battery housing, which has a main body with at least one open end, and at least one battery cell stack, which has a carrier plate at least at one end. The battery cell stack has been introduced into the main body such that the carrier plate substantially closes off the open end of the main body. On the carrier plate, there is provided an at least sectionally peripheral seal, which projects from the carrier plate and bears at least sectionally against the inner surface of the main body. The seal is of air-permeable form, so that, during the introduction of a fluid of relatively high viscosity into an intermediate space between the battery cell stack and the inner surface of the main body, displaced air can escape from the main body through the seal.

12 Claims, 4 Drawing Sheets

(58) Field of Classification Search
USPC .......................................................... 429/156
See application file for complete search history.

(56) References Cited

U.S. PATENT DOCUMENTS

| | | | |
|---|---|---|---|
| 2014/0023906 A1* | 1/2014 | Hashimoto | H01M 10/625 |
| | | | 429/157 |
| 2016/0118701 A1* | 4/2016 | Subramanian | H01M 10/0481 |
| | | | 429/120 |
| 2019/0088981 A1 | 3/2019 | Chen et al. | |
| 2019/0165437 A1 | 5/2019 | Kellner et al. | |
| 2020/0152933 A1* | 5/2020 | Thurmeier | H01M 50/204 |
| 2020/0358061 A1 | 11/2020 | Mostofi et al. | |
| 2021/0135313 A1 | 5/2021 | Simon et al. | |
| 2022/0158295 A1* | 5/2022 | Kotik | H01M 10/6567 |

FOREIGN PATENT DOCUMENTS

| | | |
|---|---|---|
| DE | 102017204412 A1 | 9/2018 |
| JP | 2015106432 A | 6/2015 |
| KR | 20140052419 A * | 5/2014 |

OTHER PUBLICATIONS

English translation of the Chinese Office Action for Chinese Application No. 202210138142.9, issued Dec. 30, 2023, 10 pages.

* cited by examiner

BATTERY MODULE

CROSS-REFERENCE TO RELATED APPLICATION

This application claims priority to German Patent Application No. 10 2021 103 866.9 filed Feb. 18, 2021, the content of such application being incorporated by reference herein in its entirety.

FIELD OF THE INVENTION

The invention relates to a battery module for a partially or fully electrically operated vehicle. The invention also relates to a battery system having two or more such battery modules, and to a method for producing a battery module.

BACKGROUND OF THE INVENTION

US 2012/0114986 A1, which is incorporated by reference herein, discloses an auxiliary battery having a metallic container, in which an electrode arrangement and an electrolyte are accommodated, and having a metallic cap, which closes off the container. There is furthermore provided a fusion connection element, whose melting point is lower than that of the container and that of the cap and which connects the container and the cap to one another. The introduction of a fluid is not discussed here.

US 2019/0088981 A1, which is incorporated by reference herein, discloses a lithium slurry battery module and a non-liquid cell core for a lithium slurry battery, wherein the cell core has multiple positive electrode pieces and negative electrode pieces that overlap in an alternating manner. The peripheral edges of the positive electrode piece and of the negative electrode piece are insulated and sealed. Here, too, an introduction of a fluid is not described.

SUMMARY OF THE INVENTION

The battery module comprises at least one battery housing, which has a main body with at least one open end, preferably with two open ends. The battery module furthermore comprises at least one battery cell stack, which has a respective carrier plate at least at one end, preferably at both ends. The battery cell stack has been introduced or pushed into the main body, or into a channel formed in the main body, such that the respective carrier plate substantially closes off the open end of the main body. On the carrier plate, there is provided an at least sectionally peripheral, preferably completely peripheral, seal, which projects from the carrier plate (outwardly toward the main body) and bears at least sectionally against the inner surface of the main body. The seal is of gas-permeable or air-permeable form, so that, during the introduction of a fluid of relatively high viscosity into an intermediate space (for example gap) between the battery cell stack and the inner surface of the main body, displaced air can escape from the main body through the (gas-permeable) seal.

In this way, the intermediate space in the main body can be filled in a reliable and uniform manner with the fluid of relatively high viscosity. The fact that the air displaced by the fluid introduced can escape through the seal means that air pockets can be avoided. A defined application area of the fluid can be achieved. The fill level of the fluid in the intermediate space can be detected, for example in that the intermediate space is filled until air no longer escapes at the seal. Moreover, the fill level can be determined through detection of a pressure increase in the case of a completely filled intermediate space.

The battery module is in particular a traction battery module for a partially or fully electrically operated vehicle. The battery module may be in the form of a battery module cooled on one side or on two sides. The battery cell stack has at least two stacked battery cells. It is also possible for the battery cell stack to have more than two battery cells which are arranged in a row ("one row and multiple columns"). It is likewise conceivable that the battery cell stack has more than two battery cells which are arranged in multiple rows one next to the other ("multiple rows and multiple columns"). Irrespective of this, for filling the intermediate space with the fluid of relatively high viscosity, there may be provided a filling opening, for example at the carrier plate, via which the fluid of relatively high viscosity is introduced into the intermediate space.

Preferably, the seal may be formed in such a way that it is impermeable to the fluid of relatively high viscosity. Consequently, the seal, or the sealing thus realized, has a sufficiently high degree of tightness that spreading of the fluid of relatively high viscosity is limited to the desired region (intermediate space), and has a sufficiently low degree of tightness that, during the introduction or injection of the fluid of relatively high viscosity, the air can escape through the seal. In other words, the seal is formed in such a way that the fluid of relatively high viscosity cannot escape from the intermediate space or can escape therefrom only in the event of a very large increase in pressure. The tightness in relation to the fluid of relatively high viscosity and the simultaneous leakiness in relation to gases may be utilized to the effect that a fluid of relatively high viscosity, for example a heat-conducting paste, is introduced into the sealed space (intermediate space) and the air contained therein can flow out via the seal. A completely filled level can be determined by way of an increase in pressure.

Preferably, the respective carrier plate(s) may be in the form of a plastic injection-molded component. In this way, inexpensive and efficient production of the carrier plate is possible. An injection-molding process allows a large number of features to be incorporated in the carrier plate. The plastic configuration moreover has the advantage that the carrier plate has electrically insulating properties.

Preferably, the respective seal, or the respective seals in the case of a battery cell stack with two carrier plates, may be of self-reinforcing form. Consequently, the sealing action can increase through impingement of the fluid of relatively high viscosity on the seal. Possibly, by way of impingement of the fluid of relatively high viscosity, the seal can end up in abutment or complete abutment with the inner surface of the main body.

Preferably, the respective seal, or the respective seals in the case of a battery cell stack with two carrier plates, may be connected to the carrier plate, in particular adhesively bonded onto or injection-molded onto the carrier plate. This makes possible a structurally simple and stable fastening of the seal to the carrier plate.

Preferably, the main body may be in the form of a hollow profile, in particular in the form of an extrusion profile. This promotes a structurally simple, inexpensive and stable configuration of the main body.

Preferably, the fluid of relatively high viscosity with which the intermediate space is at least partially filled may be in the form of a (curable) heat-conducting paste. This contributes to better and more uniform cell cooling through wetting of the cells with heat-conducting paste. It is possible to achieve quicker charging and longer service lives of the cells through reduced cell aging.

Preferably, the respective carrier plate(s) may have a holder for cell tabs. This allows cell tabs to be secured in a simple manner directly by means of the carrier plate. The cell tabs may be cell connections, such as for example positive terminal, negative terminal, sensor connection and/or protection connection.

Preferably, the respective carrier plate(s) may have a holder for conductor rails. This allows conductor rails to be secured in a simple manner directly by means of the carrier plate. The conductor rails may be connected electrically for example to the terminals or cell tabs of the battery cells.

Preferably, the respective carrier plate(s) may serve at least sectionally as an electrical insulation layer between battery cell stack and battery housing. This contributes to a structurally favorable design since the carrier plate provides an insulation function.

Preferably, in the region into which the fluid of relatively high viscosity has been introduced (intermediate space), the wall of the battery housing that outwardly delimits the battery housing may be formed without any openings (no opening in the wall of the battery housing). As a result of omission of an air outlet hole, it is also the case that air outlet hole-sealing with respect to the outside is unnecessary. Fill-level detection may, owing to the omission of an air outlet hole, be realized by way of an increase in pressure in the case of a sufficiently filled region (intermediate space).

Also described herein is a battery system having two or more battery modules with one or more of the above-described aspects. With regard to the advantages, reference is made to the related statements concerning the battery module.

The battery system is in particular a traction battery system for a partially or fully electrically operated vehicle. Irrespective of this, the measures described in conjunction with the battery module may serve for further configuration of the battery system.

Also described herein is a method for producing a battery module, in particular a battery module according to one or more of the above-described aspects. With regard to the advantages, reference is made to the related statements concerning the battery module.

The method for producing a battery module comprises the following steps:
  providing at least one battery housing having a main body with at least one open end; and
  introducing or pushing into the main body at least one battery cell stack having a respective carrier plate at least at one end, preferably at both ends, wherein the carrier plate in each case substantially closes off the open end of the main body. The method is distinguished by the fact that, on the carrier plate, there is provided a gas-permeable or air-permeable, at least sectionally peripheral, preferably completely peripheral, seal, which, following a pushing-in action, bears at least sectionally against the inner surface of the main body, and by introduction of a fluid of relatively high viscosity (for example a heat-conducting paste) into an intermediate space (for example gap) between the battery cell stack and the inner surface of the main body, wherein the air displaced during the introduction of the fluid of relatively high viscosity can escape through the seal. The fluid of relatively high viscosity may be introduced via a corresponding filling opening.

Preferably, the seal may be impermeable to the fluid of relatively high viscosity, so that the fluid of relatively high viscosity remains in the intermediate space between the battery cell stack and the inner surface of the main body. Consequently, the fluid of relatively high viscosity cannot escape from the intermediate space or can escape therefrom only in the event of a very large increase in pressure. The tightness in relation to the fluid of relatively high viscosity and the simultaneous leakiness in relation to gases or air may be utilized to the effect that a fluid of relatively high viscosity, for example a heat-conducting paste, is introduced into the sealed space, the air contained therein can flow out via the seal and a sufficiently filled level can be determined, for example by filling until air no longer escapes at the seal.

Preferably, during the introduction of the fluid of relatively high viscosity into the intermediate space, the pressure of the fluid may be detected, wherein, upon exceedance of a defined pressure threshold value, a sufficient, possibly complete, filling of the intermediate space with the fluid of relatively high viscosity is detected. This may be realized for example by a corresponding pressure sensor arrangement at a filling device used to fill the intermediate space with the fluid of relatively high viscosity. Sufficient filling of the intermediate space, possibly of differing size due to tolerances, with fluid of relatively high viscosity is consequently ensured by pressure-based detection ("not too little, but also not too much"). This possibly allows cost and weight reductions for the fluid of relatively high viscosity.

Preferably, upon exceedance of the defined pressure threshold value, the introduction of the fluid of relatively high viscosity into the intermediate space may be stopped. Consequently, in the case of sufficient, possibly complete, filling of the intermediate space between the battery cell stack and the inner surface of the main body and application of pressure to the seal, the pressure increase is used for automated stopping of the fluid- or gap filler-filling process. The filling process is consequently stopped not in a volume-controlled manner but in a pressure-controlled manner. This allows sufficient filling of the intermediate space with fluid of relatively high viscosity, such as for example heat-conducting paste, even in the case of intermediate spaces having, for example due to tolerance, differing sizes.

BRIEF DESCRIPTION OF THE DRAWINGS

Further advantageous configurations emerge from the following description and the drawing. In the drawing, in each case schematically.

DETAILED DESCRIPTION OF INVENTION

Figure 1:
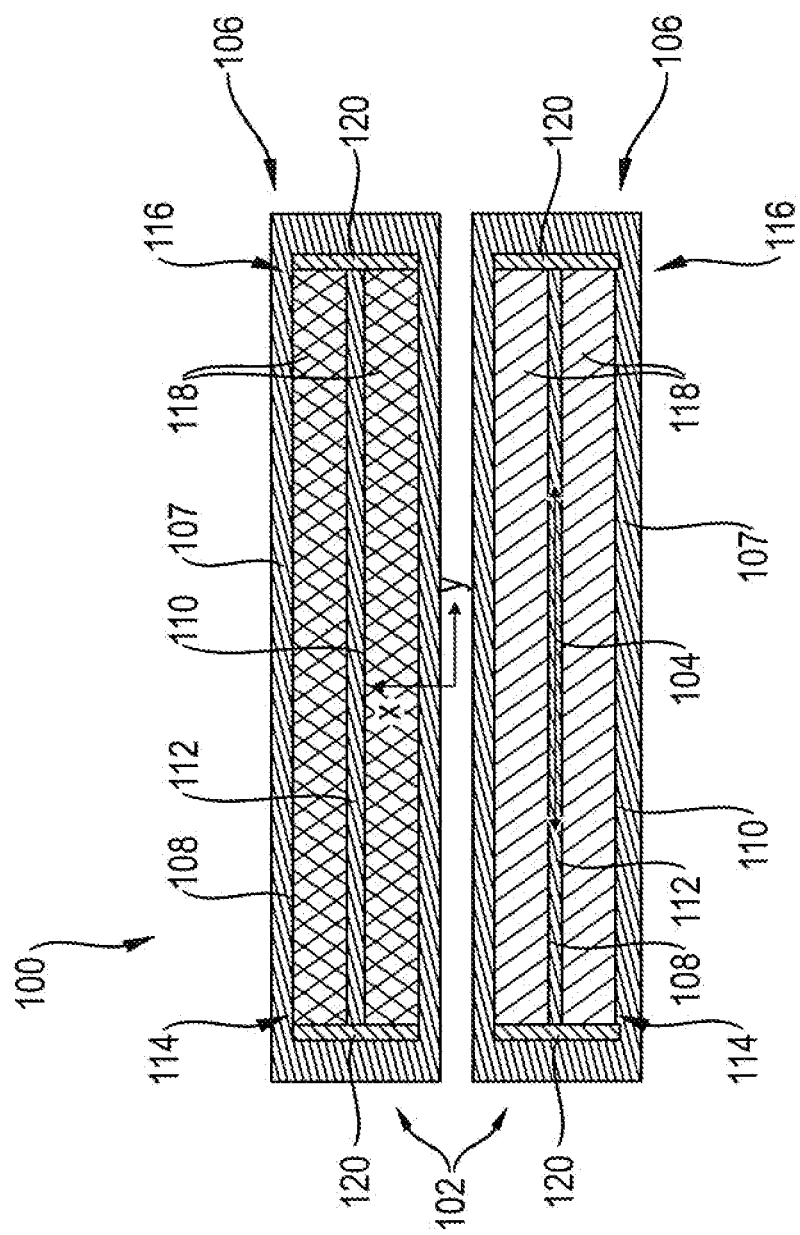
FIG. 1 shows a cross section through a battery system having two battery modules.

FIG. 1 schematically shows a cross section through a battery system 100, which has two battery modules 102 in the example. The battery system 100 may be installed in a vehicle (not illustrated) for example in such a way that the central longitudinal axis 104 of the battery system 100 or of the battery modules 102 extends parallel to the vehicle transverse direction y. The vehicle longitudinal direction x is oriented orthogonally to the central longitudinal axis 104 in the example.

The battery modules 102 each have a battery housing 106 with a main body 107 in which, in the example, in each case two channels 108, 110 are formed, said channels extending parallel to the central longitudinal axis 104 and being separated from one another by a partition 112. The channels 108, 110 are delimited outwardly by a wall 111 (cf. FIG. 2). The channels 108, 110 each have two open ends 114, 116 (cf. FIG. 1). In the example, the main bodies 107 are each designed as a hollow profile in the form of an extrusion profile.

In the channels 108, 110, there is arranged in each case one battery cell stack 118, which has at both ends in each case one carrier plate 120. The battery cell stacks 118 have been introduced into the main body 107 or the channels 108, 110 in such a way that the respective carrier plate 120 substantially closes off the respective open end 114, 116 of the main body 107.

The further construction of a battery module 102 will be explained with reference to FIGS. 2 to 4. In the example, the battery cell stacks 118 have a multiplicity of stacked battery cells 122, which are arranged in multiple columns 124 (cf. FIGS. 2 and 3).

Figure 3:
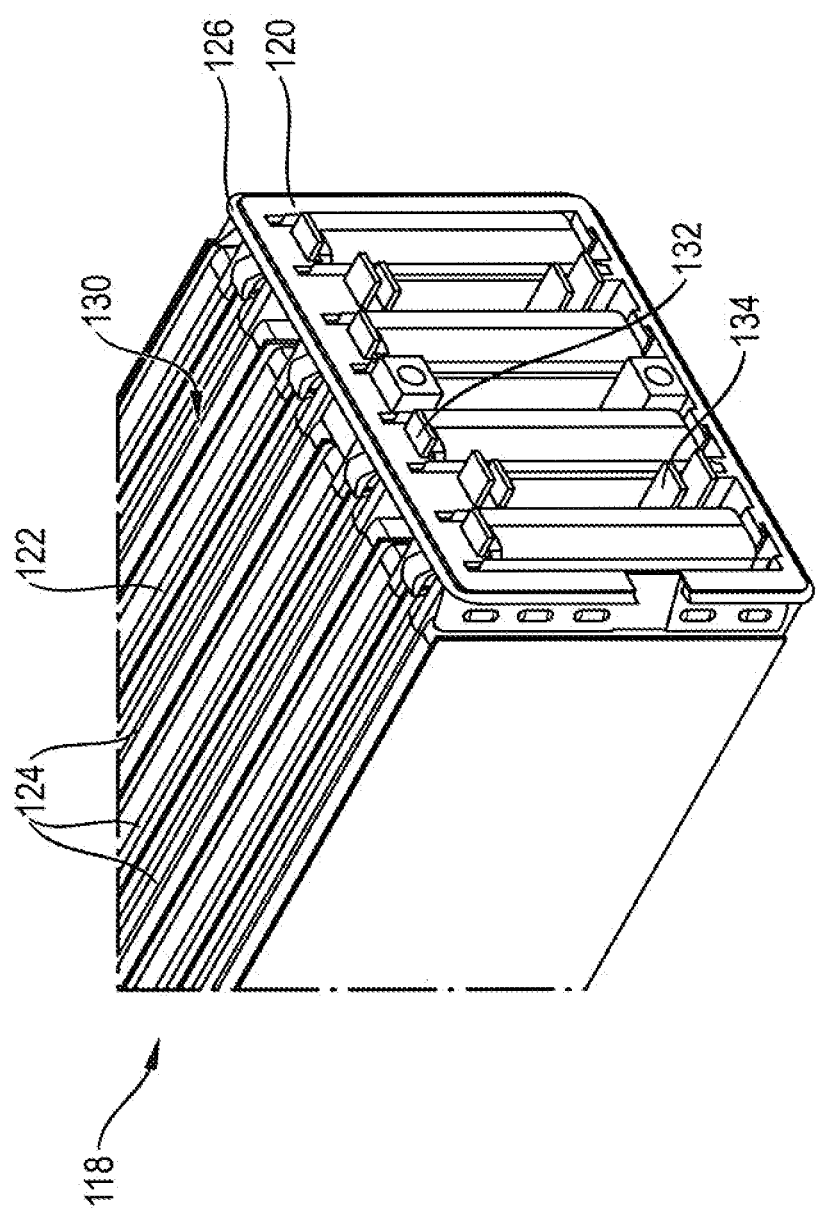
FIG. 3 shows an enlarged perspective partial view of a battery cell stack.

On the carrier plate 120, there is provided in each case one at least sectionally peripheral seal 126, which, in the example, runs around the carrier plate 120 almost completely, for example to an extent of more than 90% (cf. FIG. 3). The seal 126 projects from the carrier plate 102 outwardly toward the main body 107 and bears at least sectionally against the inner surface 128 of the main body 107 or of the channels 108, 110 formed in the main body 107 (cf. FIG. 4). The seal 126 is of air-permeable form, so that, during the introduction of a fluid 129 of relatively high viscosity into an intermediate space or gap 130 (cf. FIGS. 3 and 4) between the battery cell stack 118 and the inner surface 128 of the main body 107, displaced air can escape from the main body 107 through the seal 126.

The seals 126 are each formed in such a way that they are impermeable to the fluid 129 of relatively high viscosity. Consequently, the seal 126 has a sufficiently high degree of tightness that spreading of the fluid 129 of relatively high viscosity is limited to the desired region (intermediate space 130), and has a sufficiently low degree of tightness that, during the introduction of the fluid 129 of relatively high viscosity, the air can escape through the seal 126.

Figure 2:
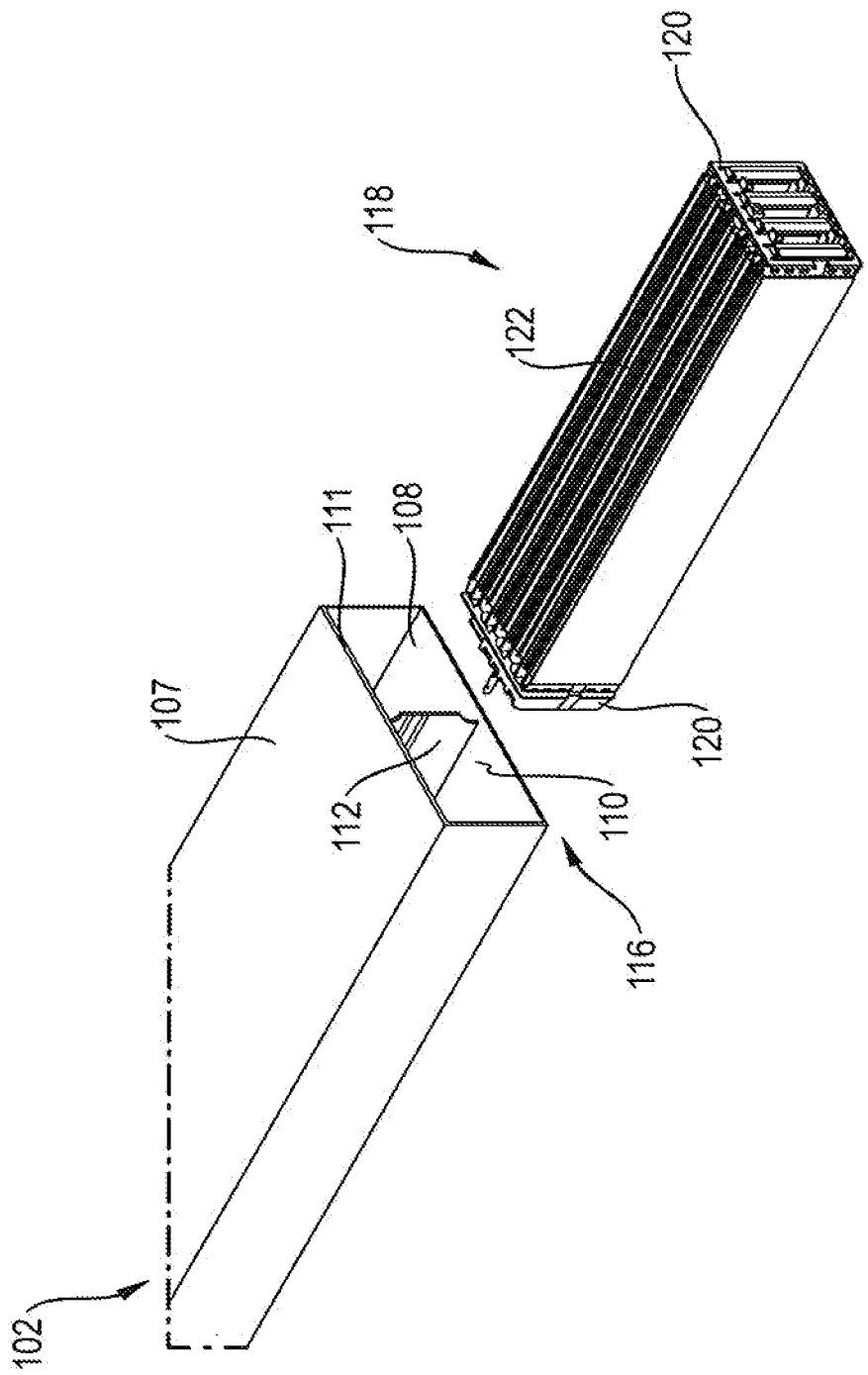
FIG. 2 shows a perspective partial view of a battery module.

In the example, the carrier plates 120 are each in the form of a plastic injection-molded component (cf. FIGS. 2 and 3). The seals 126 are each connected to the carrier plate 120, in particular adhesively bonded onto or injection-molded onto the carrier plate 120.

Optionally, the seals 126 may in each case be of self-reinforcing form. Consequently, the sealing action can increase through impingement of the fluid 129 of relatively high viscosity on the respective seal 126 (cf. FIG. 4). In the example, the fluid 129 of relatively high viscosity with which the intermediate space 130 is at least partially filled is in the form of a curable heat-conducting paste (gap filler).

In the example, the carrier plates 120 each have a holder 132 for cell tabs (cf. FIG. 3). This allows cell tabs to be secured in a simple manner directly by means of the carrier plate 120. In the example, the carrier plates 120 each have a holder 134 for conductor rails. In this way, conductor rails can be secured by means of the carrier plate 120. The carrier plates 120 may each serve at least sectionally as an electrical insulation layer between battery cell stack 118 and battery housing 106.

Figure 4:
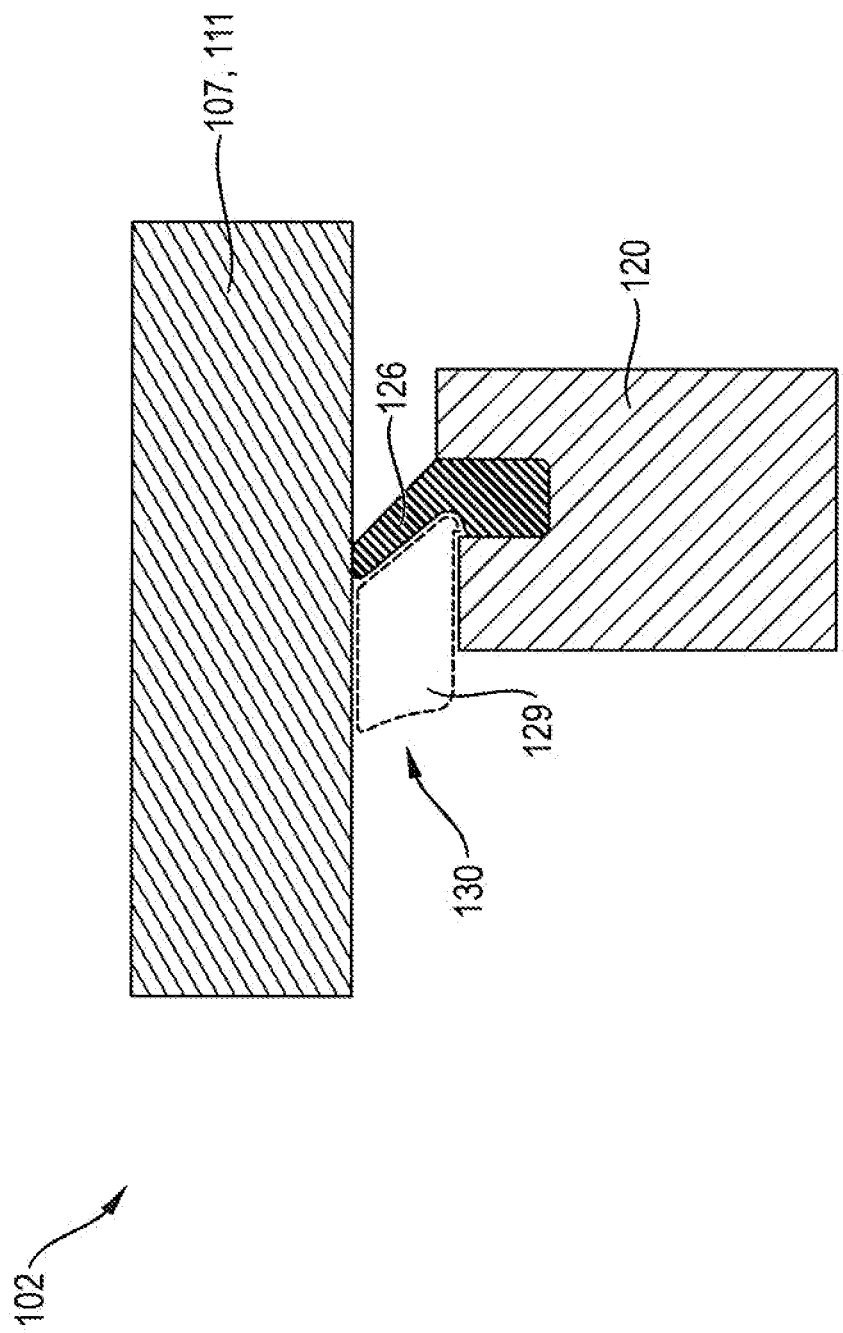
FIG. 4 shows a partial longitudinal section of a battery module.

In the region into which the fluid of relatively high viscosity has been introduced (intermediate space 130), the wall 111 of the battery housing 106 is formed without any openings (cf. FIGS. 2 and 4). Consequently, the wall 111 of the battery housing 106 has no opening.

The method for producing a battery module 106 and in particular a detection of the fill level of the fluid of relatively high viscosity or heat-conducting paste 129 in the intermediate space 130 may proceed as described above.

What is claimed is:

1. A battery module for a partially or fully electrically operated vehicle, said battery module comprising:
at least one battery housing having a main body defining at least one battery cell stack receiving channel having an inner surface that terminates at at least one open end;
at least one battery cell stack disposed within the battery cell stack receiving channel of the main body, the battery cell stack including a carrier plate fixed to one end of the battery cell stack and positioned adjacent at least at one end of the main body, wherein the battery cell stack is configured to be introduced into the battery cell stack receiving channel of the main body such that the carrier plate substantially closes off the open end of the main body and a side surface of the carrier plate faces the inner surface of the battery cell stack receiving channel; and
a peripheral seal mounted on the carrier plate and extending in an intermediate space disposed between the carrier plate and the inner surface of the main body, which peripheral seal projects from the carrier plate and bears at least partially against the inner surface of the main body,
wherein the seal is of gas-permeable form, such that, upon introducing a fluid into the intermediate space between the battery cell stack and the inner surface of the battery cell stack receiving channel of the main body, displaced air can escape from the main body through the seal.

2. The battery module as claimed in claim 1, wherein the seal is impermeable to the fluid.

3. The battery module as claimed in claim 1, wherein the carrier plate is a plastic injection-molded component.

4. The battery module as claimed in claim 1, wherein the seal is of self-reinforcing form, and/or the seal is either adhesively bonded onto the carrier plate or injection-molded onto the carrier plate.

5. The battery module as claimed in claim 1, wherein the main body is a hollow extrusion profile.

6. The battery module as claimed in claim 1, wherein the fluid is a curable heat-conducting paste.

7. The battery module as claimed in claim 1, wherein the carrier plate has a holder for cell tabs, and/or the carrier plate has a holder for conductor rails, and/or the carrier plate serves at least partially as an electrical insulation layer between the battery cell stack and battery housing.

8. The battery module as claimed in claim 1, wherein, in a region into which the fluid is introduced, the wall of the battery housing is formed without any openings.

9. A battery system comprising two or more of said battery modules of claim 1.

10. The battery module as claimed in claim 1, wherein the battery cell stack is positioned within the battery cell stack receiving channel of the main body, the carrier plate substantially closes off the open end of the main body and the side surface of the carrier plate faces the inner surface of the battery cell stack receiving channel.

11. The battery module as claimed in claim 1, wherein the carrier plate is recessed within the battery cell stack receiving channel and spaced apart from the open end of the main body.

12. The battery module as claimed in claim 1, wherein the at least one battery cell stack receiving channel comprises first and second battery cell stack receiving channels, and wherein the at least one battery cell stack comprises first and second battery cell stacks, wherein the carrier plate of the first battery cell stack is positioned within the first battery cell stack receiving channel and the carrier plate of the second battery cell stack is positioned within the second battery cell stack receiving channel.

* * * * *